US005161234A

United States Patent [19]

Nitta

[11] Patent Number: 5,161,234

[45] Date of Patent: Nov. 3, 1992

[54] HANGING ORNAMENTS FOR EYEGLASSES

[75] Inventor: Yukuo Nitta, Fukui, Japan

[73] Assignee: Seelex Kabushiki Kaisha, Fukui, Japan

[21] Appl. No.: 634,627

[22] Filed: Dec. 27, 1990

[30] Foreign Application Priority Data

May 9, 1990 [JP] Japan .............................. 2-48877[U]

[51] Int. Cl.[5] .............................................. G02C 11/02

[52] U.S. Cl. ........................................ 351/52; 351/51; 351/153

[58] Field of Search .................... 351/51, 52, 111, 153

[56] References Cited

U.S. PATENT DOCUMENTS 2,766,541 10/1956 Quinones et al. .................... 351/51
2,960,787 11/1960 Quinones et al. .................... 351/52

*Primary Examiner*—Paul M. Dzierzynski
*Attorney, Agent, or Firm*—Staas & Halsey

[57] ABSTRACT

The present invention discloses various kinds of ornamental materials which are freely attachable to an eyeglass frame. The ornaments are attached by connecting loop-like hanging portions to temple pieces of eyeglasses by way of a link-type fastener. This allows the ornaments to be simple and easily changed.

2 Claims, 3 Drawing Sheets 5
4
41
3
1
2
4
3
5

HANGING ORNAMENTS FOR EYEGLASSES

BACKGROUND OF THE INVENTION

This invention relates to ornaments for eyeglasses, and more particularly to ornaments and decorations freely attachable to eyeglasses. Generally, eyeglasses are decorated with various ornaments and decorations to make a personal statement.

In the prior art, ornamental materials such as jewels and chains are fixed to a pair of eyeglasses and cannot be freely exchanged. These decorated eyeglasses can be worn in a private party or meeting, but they may not be appropirate for a formal party or meeting. Thus, a new pair of eyeglasses must be worn that are appropriate for the occassion. Therefore, a person must have various pairs of eyeglasses, one for each situation. This can be very expensive. Even if a person can afford numerous eyeglasses for various occasions, it is very inconvenient to have to carry plural eyeglasses. In any case, eyeglasses wearers are generally forced to wear the same pair of eyeglasses in spite of the situations.

In view of these circumstances, a new spectacle frame has recently been developed. An end piece of a rim of the eyeglasses is bifurcated in form, whereon a hole is established to receive an ornament. The ornament is adapted to fit correctly in the hole by a rivet. Some ornaments are pre-arranged to fit correctly in the hole in accordance with the eyeglass design.

This prior art, however, has the following defects. In order to exchange the placed ornament for a new ornament, the rivet must be detached. This is quite difficult and virtually impossible without professional help. In addition, the ornament is limited to the special standard shape or size in accordance with the eyeglass frame, and therefore wearers cannot select freely desired shapes or sizes and are restricted in what can be worn.

In view of the above problems in the prior art, including the difficulty in changing ornaments and having limited designs available, this invention has been developed.

SUMMARY OF THE INVENTION

It is an object of the present invention to provide ornamental and decorative means for eyeglasses, wherein exchanging of an ornament is simple and a shape and/or size of the ornament is not limited.

In order to realize the above mentioned objects, eyeglasses are provided having a front frame and a shaft screw formed on both ends of the front frame respectively connecting and holding a pair of foldable temples via a hinge. An inserting sleeve, joining member and joining portions are formed on either the temple, the hinge or the shaft screw. Ring portions are established on an ornament. The eyeglasses and an ornament are connected together via a link fastener.

These objects, together with other objects and advantages which will be subsequently apparent, reside in the details of construction and operation, as more fully hereinafter described and claimed, reference being had to the accompanying drawings forming a part hereof, wherein like reference numerals refer to like parts throughout.

BRIEF DESCRIPTIONS OF THE DRAWINGS

DETAILED DESCRIPTIONS OF THE PREFERRED EMBODIMENT

Figure 1:
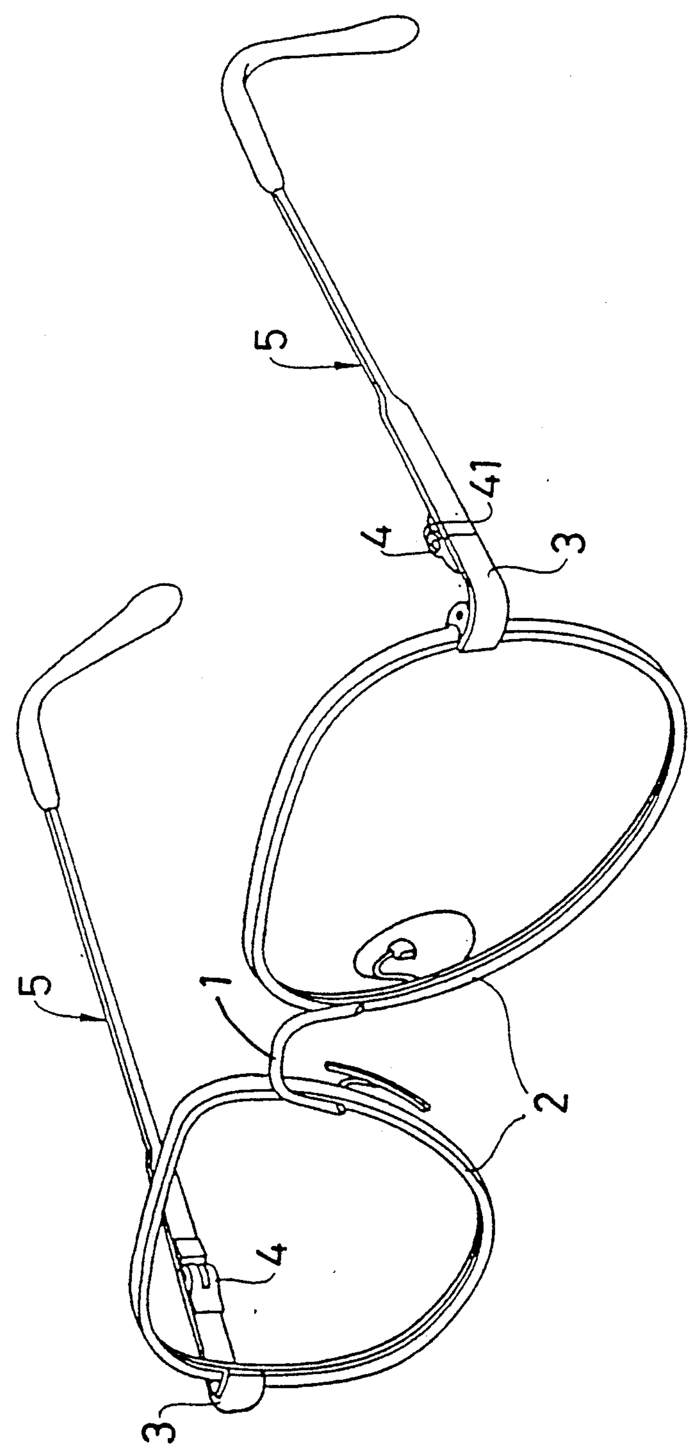
FIG. 1 is a perspective view of eyeglasses, wherein an ornament according to this invention is attachable.

With reference to FIG. 1, a bridge (1) connects two rims (2). On each end of the rim (2), a pair of end pieces (3) is formed. A pair of temples (5) is connected foldably with the end piece (3) via a pair of hinges (4). Each hinge receives a shaft screw (41) in movable condition. The eyeglasses explained above are furnished with ornamental means as stipulated in the first through fourth embodiments respectively described hereinafter.

Figure 2:
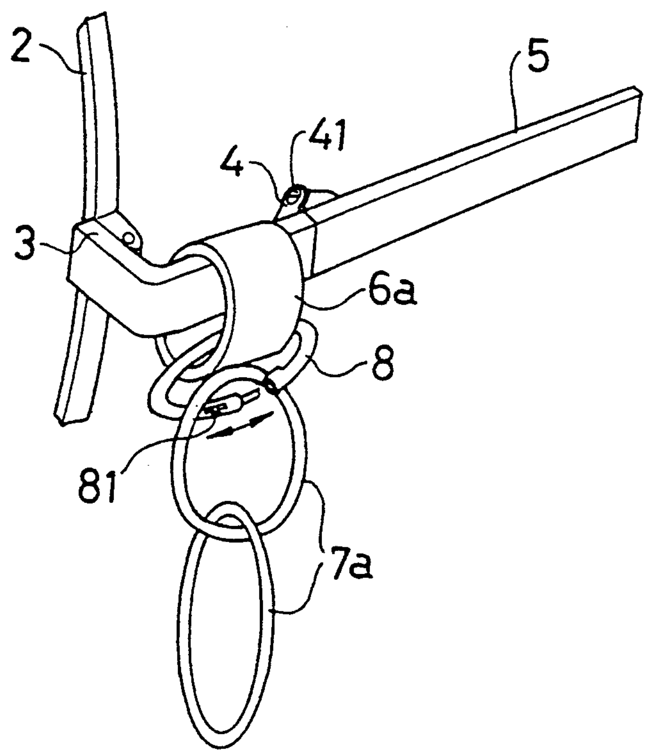
FIG. 2 is a partial perspective view showing an ornament attached to eyeglasses according to a first embodiment of this invention.

FIG. 2 is a partial perspective view of an ornament attached to a pair of eyeglasses according to the first embodiment of the present invention. An inserting sleeve **(6*a*) made of, for example, soft synthetic resin having good elasticity, is inserted onto the temple (5) from the temple end and is fit around the end piece (3). An ornament body (7*a*) made of two metal rings connected in series is then connected with the sleeve (6*a*) via a fastener (8). The fastener (8) is a well-known bolt ring, and is operated by a knob portion (81) which can be opened and closed. Thus, the inserting sleeve (6*a*) and the ornament body (7*a*)** are securely connected to the eyeglasses.

The eyeglasses in the first embodiment shown in FIG. 2 as explained above can include ornamental materials other than the rings connected in series, since the ornaments can be freely exchanged in a simple manner. The ornamental materials need only include loops to connect with the fastener (8). Therefore shapes and/or sizes of the ornaments are not limited. As a matter of course, such ornaments can be hung at both sides of the temples. When the wearer does not want to wear the attached ornament, the inserting sleeve (6) need only be displaced from the temple.

Figure 3:
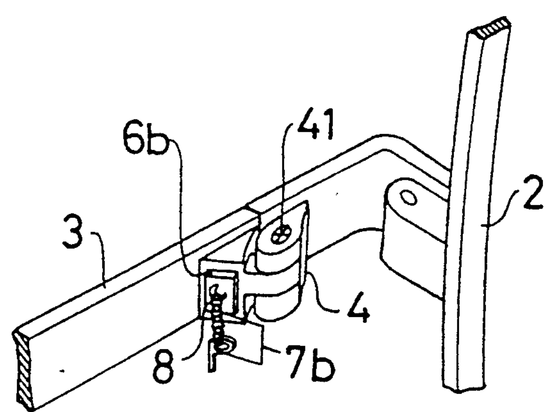
FIG. 3 is a partial perspective view showing an ornament attached to eyeglasses according to a second embodiment of the present invention.
Figure 4:
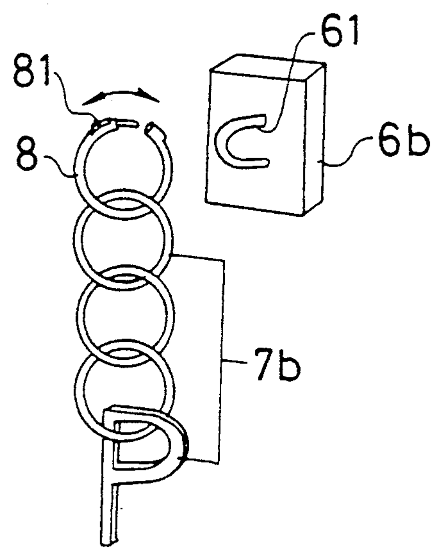
FIG. 4 is an enlarged perspective view of the second embodiment of the present invention.

FIG. 3 and FIG. 4 refer to a second embodiment of the present invention. A joining member **(6*b*) is formed from plastic in an oblong shape, approximately, for example, 3 milimeters long, 2 milimeters high and 1 milimeter thick. As shown in FIG. 4, a joining portion (61) having a loop style is connected to the joining member (6*b*) and the joining member (6*b*) is connected with a hinge (4) as shown in FIG. 3. An ornament (7*b*) is composed of three metal rings and "P" letter (which expresses, for example, the initial of the wearer) connected in series. The fastener (8) connects the ornament (7*b*) onto the joining portion (61). This fastener (8) has the same mechanism (81) as shown in FIG. 2**. The second embodiment also allows the ornament to be simply and easily removed or exchanged for a different ornament.

Figure 6:
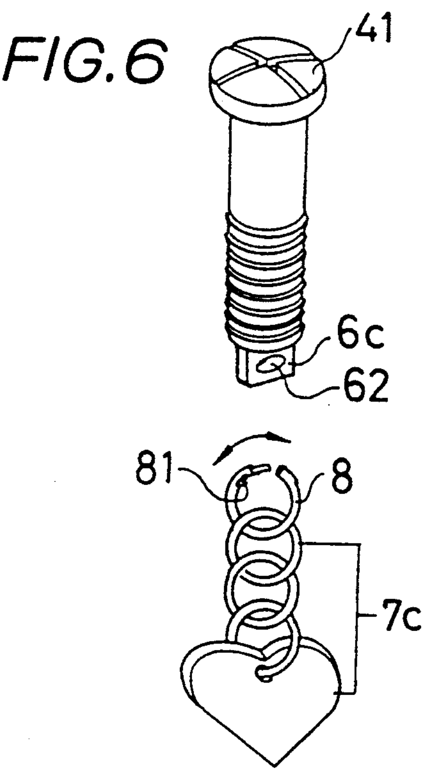
FIG. 6 is an enlarged perspective view of the third embodiment according to the present invention shown in FIG. 5, showing how to connect a shaft screw, a fastener, and an ornament.
Figure 5:
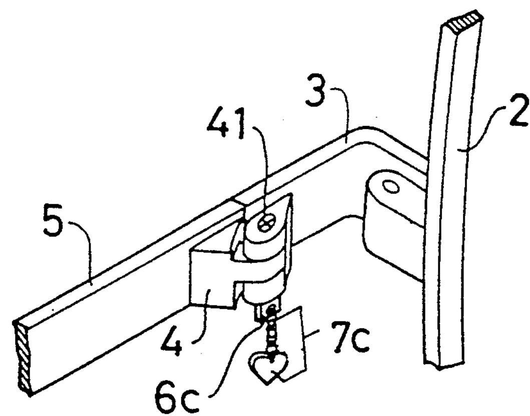
FIG. 5 is a partial perspective view showing an ornament attached to eyeglasses according to a third embodiment of the present invention.

FIG. 5 and FIG. 6 refer to a third embodiment of the present invention. A shaft screw (41) runs through a hinge (4) and has a hanging hole (62) on its end as an integral part thereof. An ornament (*7c*) is composed of three metal rings and a heart-shaped metal plate connected in series. The fastener (8) connects the ornament (*7c*) onto the hanging hole (62). The fastener (8) is a bolt-ring fastener which is the same as that shown in FIG. 2. Therefore, the third embodiment also realizes a simple exchange of ornaments.

Figure 7:
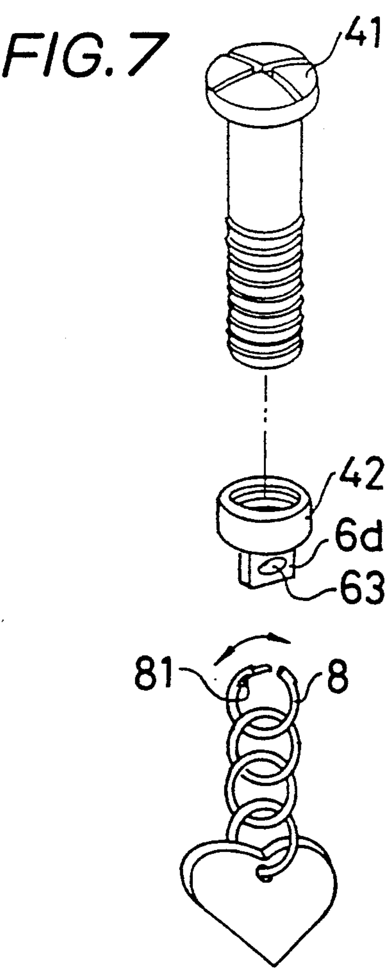
FIG. 7 is an enlarged perspective view of a fourth embodiment according to the present invention showing how to connect a shaft screw, a cap nut and an ornament.

With reference to FIG. 7, a fourth embodiment is explained. A shaft screw (41) runs through a hinge (4) and has a screwed tip protruding outside approximately 1 milimeter. A cap nut (42) is connected to the the protruding screw tip by screwing. A boss-form joining portion (*6d*) is formed on the top of the cap nut (42), and a hanging hole (63) is formed therethrough. An ornament can be connected to the hanging hole (63) by way of the fastener (8), as shown in FIG. 6. In addition, as in other embodiments, ornament can be exchanged in a simple manner.

The four preferred embodiments have been now explained. This invention, however, is not limited to only the explained embodiments. Various changes or variations can be derived in view of the scope of the appended claims. As an example, in the first embodiment, the inserting sleeve can be made from shape memory alloy wherein the sleeve can be usable at a predetermined temperature. In addition, in the second embodiment shown in FIG. 3 and FIG. 4, the joining member can be established beneath the hinge. Still further, the shape of the fastener can be an elliptical shape, a triangular shape, or other similar shape, as far as the fastener is of link-type having a knob for opening and closing. These variations are within the scope of the present invention.

As explained above, this invention provides a hanging ornament device for eyeglasses, wherein ornaments can be hung on the eyeglasses by way of a fastener. The invention therefore realizes the practical use of various ornaments having different sizes, shapes, and styles to be worn on eyeglasses in a manner similar to ear-rings. Moreover, the eyeglass wearer only has to carry several kinds of small ornaments which can be changed in accordance with the occassion; rather than carrying numerous pairs of eyeglasses for various occasions. Thus, eyeglasses can be made suitable to time, place, and opportunity or necessity of the occasion. The ornaments can be exchanged simply and easily. The device of the present invention is also economical in that the style of eyeglasses can be changed without requiring a new pair of eyeglasses. The merit and practical use of the present invention is highly valued and appreciated.

What is claimed is:

1. Hanging ornaments for eyeglasses having a pair of temple pieces and a front frame, comprising:

a pair of hinges foldably connecting the pair of temple pieces on both ends of the front frame;

shaft screw means for running through each of said pair of hinges;

a joining member having a hanging hole and connected to said shaft screw:

fastener means for attachment to said hanging hole; and an ornament freely attached on said hanging hole via fastener means.

2. Hanging ornaments for eyeglasses according to claim 1, wherein said fastener means is a link-type fastener.

* * * * *